R. E. BALSLY.
STUMP PULLING MACHINE.
APPLICATION FILED JULY 14, 1919.

1,335,931.

Patented Apr. 6, 1920.
3 SHEETS—SHEET 1.

INVENTOR
Ralph E. Balsly
BY James N. Ramsey
ATTORNEY

R. E. BALSLY.
STUMP PULLING MACHINE.
APPLICATION FILED JULY 14, 1919.
1,335,931.
Patented Apr. 6, 1920.
3 SHEETS—SHEET 2.
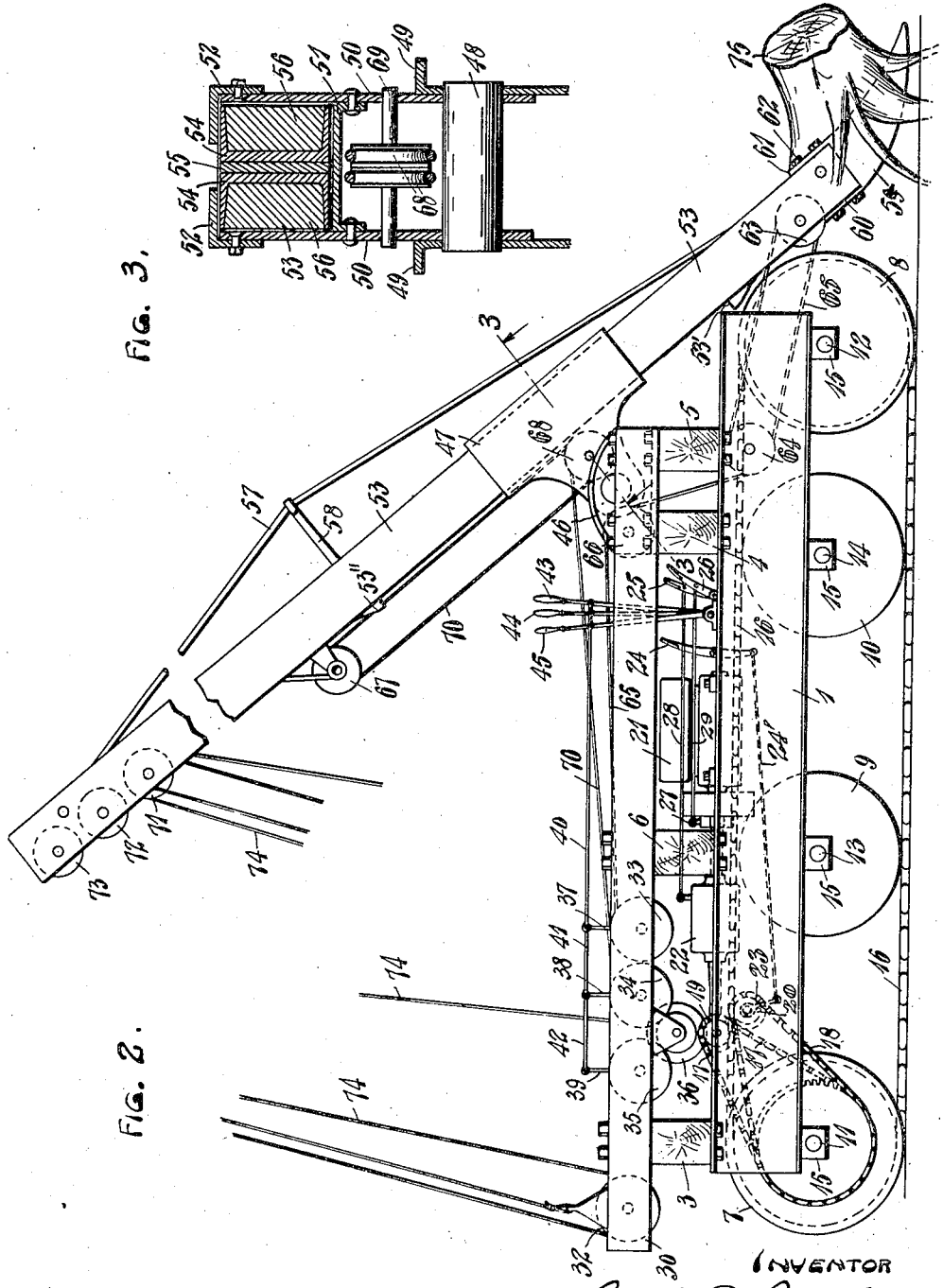

R. E. BALSLY.
STUMP PULLING MACHINE.
APPLICATION FILED JULY 14, 1919.

1,335,931.

Patented Apr. 6, 1920.

Ralph E. Balsly, INVENTOR

BY James N. Ramsey, ATTORNEY

UNITED STATES PATENT OFFICE.

RALPH E. BALSLY, OF CINCINNATI, OHIO.

STUMP-PULLING MACHINE.

1,335,931.  Specification of Letters Patent.  Patented Apr. 6, 1920.

Application filed July 14, 1919. Serial No. 310,629.

*To all whom it may concern:*

Be it known that I, RALPH E. BALSLY, a citizen of the United States, and a resident of Cincinnati, in the county of Hamilton and State of Ohio, have invented certain new and useful Improvements in Stump-Pulling Machines, of which the following is a specification.

My invention relates to hoisting, excavating and the like and its object is to provide portable means for direct action in extracting stumps of trees or other obstructions to tillage or other use of land.

My invention consists in the combination of parts and in the details of construction and arrangement of parts as will hereinafter be more fully described and claimed.

In the drawings:

Fig. 2 is a side elevation of the same represented as with parts of the boom and cables broken away and omitted for lack of space;

Fig. 3 is a cross-section through the boom mounting on a plane corresponding to the line 3—3 of Fig. 2;

Figure 1:
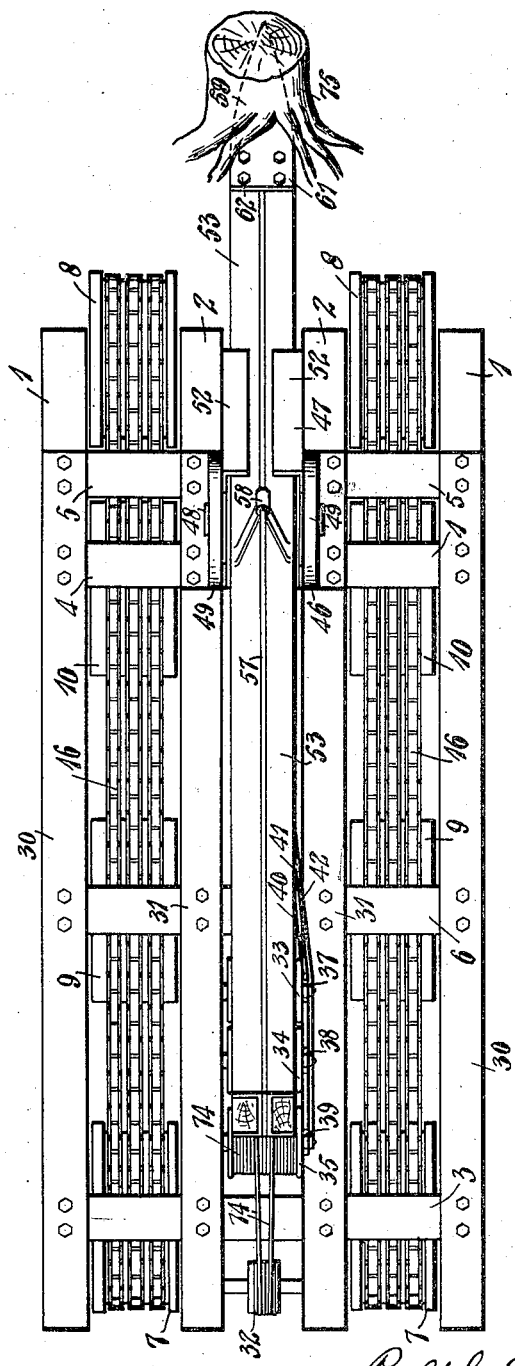
Figure 1 is a plan view of a device embodying my invention.
Figure 4:
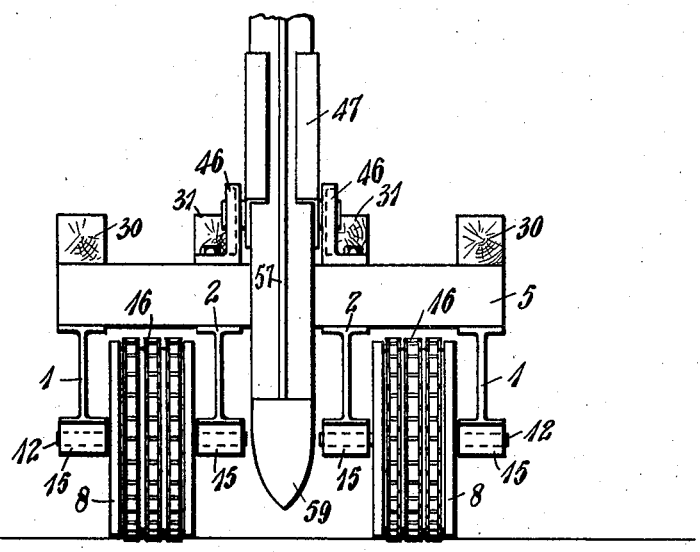
Fig. 4 is a front end elevation of the lower part of the device.
Figure 5:
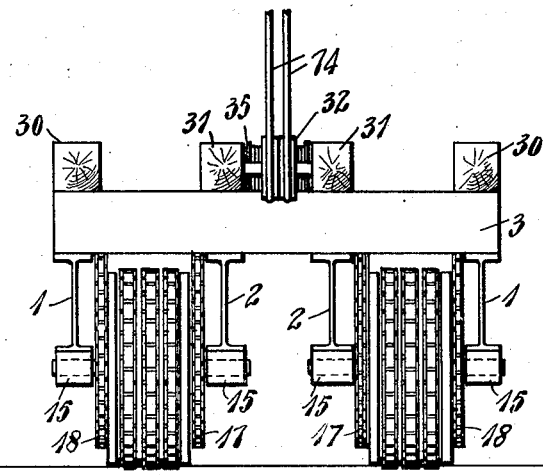
Fig. 5 is a rear end elevation of the same.

In the example shown herein the frame of the machine comprises outer longitudinal I-beams 1 and inner longitudinal I-beams 2 joined at their tops by a rear bolster 3, front bolsters 4 and 5, and a middle bolster 6 all lying transversely of the machine. There are rear flanged driving wheels 7 lying between the inner and outer I-beams 1 and 2 at the respective sides of the machine; and there are front flanged supporting wheels 8 and intermediate unflanged supporting wheels 9 and 10 similarly related to the I-beams. These wheels have transverse axles 11, 12, 13 and 14 respectively fixed in blocks 15 on the bottoms of the respective I-beams 1 and 2; the wheels turning on the axles. Around the driving wheels 7 and front wheels 8 at the respective sides pass sprocket chains 16 with the intermediate wheels 9 and 10 bearing on the lower stretches of the chains. This construction is of the caterpillar-tractor type; the sets of wheels at the two sides of the machine being driven independently—forwardly by sprocket chains 17 on suitable sprockets on the inner sides of the driving wheels 7, or backwardly by similar sprocket chains 18 on suitable sprocket wheels on the outer sides of these wheels 7. The forward-driving chains 17 pass around smaller sprocket wheels 19 on a transverse shaft near the tops of the I-beams 1 and 2 and suitably journaled thereon; and the backward-driving chains 18 pass around similar sprocket wheels 20 on a transverse shaft journaled in the frame just below the wheels 19. An engine 21, preferably of the internal-combustion type, securely mounted on the inner I-beams 2 about midway of the length of the machine, connects through suitable transmission mechanism with the sprocket wheels 19 and 20 accordingly as suitable clutching means 23 is actuated by means of a pedal 24 in the front part of the frame and connected to the means 23 by a rod 24'. Other pedals 25 and 26 control the transmission mechanism 22 and the clutch 27 between them and the engine, respectively, through connecting rods 28 and 29.

The frame preferably further comprises longitudinal outer stringers 30 and longitudinal inner stringers 31 fixed on the tops of the bolsters 3, 4, 5 and 6. These extend out past the rear bolster 3 and the inner ones 31 carry a tackle-block 32 on a transverse axis; and somewhat forwardly of this carry three drums 33, 34 and 35 on transverse axes. Any one of these drums may be rotated through the medium of intermediate gears 36 operatively connecting them with the transmission mechanism 22 accordingly as respective clutching means 37, 38 and 39 are engaged through the medium of connecting rods 40, 41 and 42 connecting with hand levers 43, 44 and 45 near the front end of the machine close to the pedals 24, 25 and 26.

The front bolster 4 and 5 and these inner stringers 31 support a pedestal 46 in which the boom-carrier 47 is fulcrumed on a heavy transverse pin 48 to tilt in a vertical plane lengthwise of the machine. The preferable construction of this boom-carrier and its mounting is more clearly shown in Fig. 3; the pedestal 46 comprising angle plates 49 flanking side plates 50 of the boom-carrier, and the plates 50 extending up with a strut plate 51 fixed between them a suitable distance above the fulcrum pin 48; and extending above this strut plate 51 with angle bars 52 bolted to them with members projecting toward each other across the top of the boom-carrier. The boom 53 is preferably made of channels 54 turned on their sides with their flat tops against a middle plate 55; the hollows of the channels receiving wooden beams 56 and all of these parts being tightly secured together. This provides a boom mainly of wood but having reinforcement and facing of metal. It slides lengthwise in the space above the strut 51 and under the angle bars 52. It is readily removable by unbolting angle bars 52. Also preferably the boom has a truss rod 57 along its upper side from near one end to near the other end and running over a strut 58 near the middle; thus further strengthening the boom.

The lower end of this boom 53 carries a spur 59 which projects forwardly and curves slightly upwardly and is firmly secured to the end of the boom by lower and upper flanges 60 and 61 receiving the boom end between them and having bolts 62 running through them and through the end of the boom. The inner I-beams 2 are spaced apart so that this lower or forward end of the boom 53 can tilt between them into a substantially vertical position or can swing out forwardly and upwardly therefrom. A tackle-block 63 is on a transverse axis in the boom 53 near this end, and another tackle-block 64 is similarly mounted in the machine just below the front bolster 5, and a cable 65 passes around the sheaves of these blocks and upwardly and backwardly over a sheave 66 over the other front bolster 4 and is wound onto the front one 37 of the three drums before mentioned. Another tackle-block 67 is on a transverse axis on the lower side of the boom 53 up about midway of the length of the boom; and a tackle-block 68 is on a transverse shaft 69 in the side plates 50 of the boom-carrier between the fulcrum pin 48 and the strut plate 51. A cable 70 passes around the sheaves of these tackle-blocks and back to the middle one 34 of the three drums.

Near its upper end the boom 53 carries three sets of tackle-blocks 71, 72 and 73 on transverse axes; and a cable 74 passes around the sheaves of any one or more of these (as around the lowermost one 71) and around the sheaves of the tackle-block 32 at the rear of the machine and is wound onto the rearmost drum 35. It has stops 53' and 53'' to limit its sliding.

The machine may be propelled forwardly by driving both inner chains 17; or backwardly by driving both outer chains 18; or may be turned to left or right by operating these chains in different combinations; all of this being possible by working the pedal 24. The boom 53 may be slid up in its carrier 47 by winding the cable 65 on the front drum 53; or slid down therein by winding the cable 70 on the middle drum 34; each drum being allowed to unwind while the other winds up and all this being accomplished by proper manipulation of the levers 43 and 44. The lower end of the boom with its spur 59 may be swung up by winding the cable 74 on the rearmost drum 35 upon manipulation of the lever 45, or swung down by the cable 65 and drum 33. Any of these operations of propelling, sliding the boom or tilting the boom may be performed slowly with corresponding increased force or more rapidly with reduced force by changing the transmission 22 by means of the pedal 25; and any operation may be instantly stopped or started by means of the clutch 27 worked by the pedal 26. All of these levers and pedals are located near the front end of the machine close to the engine 21 where these and the engine may all be conveniently controlled by a single operator stationed on the top of the machine frame on one side of the boom where the operator can readily see the front end and spur 59 of the boom.

Thus the machine may be readily run forward or backward or turned shortly in any direction to quickly bring it to the stump 75 or other obstacle to be removed from the ground. It approaches the stump with the front end of the boom thrown down with the boom slid down in its carrier 47 so that the spur 59 digs into the ground under the stump between the roots thereof. This forward motion of the entire machine is stopped when the spur 59 has sufficiently entered under the stump; and then with the boom held down by the upper cable 70 and middle drum 34 being held stationary, the rearmost drum 35 pulls the upper end of the boom down and lifts this stump somewhat as indicated in the drawings. The length of the boom above the fulcrum 48 being much greater than that from the fulcrum to the stump, the mechinical advantage is thereby very great; and this is augmented through the action of the tackle made up of the cable 74 and its tackle-blocks. It is found in practice that with the fulcrum of the boom located about as far back from the front supporting wheels 8 as shown herein, there will be no upward tilting of the machine as a whole toward the stump nor backing out of the machine away from the stump. On the contrary the extreme pressure at the fulcrum is far more than enough to overcome any such lifting tendency, and the resultant of the operation is to press the machine heavily against the ground and forwardly toward the stump without any need of brakes or forward propulsion during the actual stump-lifting operation. The broad supporting surfaces of the caterpillar chains insures against creeping of the machine even in soft ground both while traveling from one stump to another and during the actual extracting operation.

The machine is thus readily portable and adjustable to the different stumps however irregular or thickly these may be found; and yet has an extremely powerful extracting action and is simple in its construction and operation for all of these purposes.

While certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In a power operated stump-pulling machine, an element to engage under an obstruction, a fulcrum for said element, tiltable means pivotally mounted on said fulcrum, slidable means in said tiltable means, and power operated means connected to said slidable element for pulling down on the upper end of said slidable element across said fulcrum to dislodge said obstruction.

2. In a portable power operated stump-pulling machine, an element to engage under an obstruction, a fulcrum for said element, means for tilting said element on said fulcrum to dislodge the obstruction, and means for transporting said element and said means bodily from one obstruction to another comprising said wheels, said element being adapted to tilt between said wheels in the middle of said machine.

3. In a portable power operated stump-pulling machine, a frame, tractor wheels supporting said frame, a fulcrum mounted on said frame, a boom slidably and tiltably mounted on said fulcrum, cables connecting the upper end of said boom to the rear end of said frame, means for applying power to the upper end of said boom, through said cables to draw it downwardly across said fulcrum, said fulcrum being located a sufficient distance to the rear of the front wheels whereby the downward pressure upon the fulcrum will overcome the upward pressure in pulling said boom down and thereby maintain said machine in a given position.

4. In a machine of the character described, an element to engage under an obstruction, a fulcrum for said element, near one end of said machine, a supporting wheel for said machine extending past and in front of said fulcrum at this end, a winding drum on said machine, a cable connected to said element and wound on said drum, and means for rotating said drum to wind said cable thereon and tilt said element on said fulcrum to dislodge the obstruction.

5. In a machine of the character described, an element to engage under an obstruction, a fulcrum for said element, near one end of said machine, a supporting wheel for said machine extending past said fulcrum at this end, a winding drum on said machine, a cable connected to said element and wound on said drum, and means for rotating said drum to wind said cable thereon and tilt said element on said fulcrum to dislodge the obstruction, said element being slidable on said fulcrum, a second drum on said machine, a cable connected to said element and wound on said second drum, and means for rotating said second drum to wind said cable thereon and slide said element on its fulcrum.

6. In a machine of the character described, an element to engage under an obstruction, a fulcrum for said element, near one end of said machine, a supporting wheel for said machine extending past said fulcrum at this end, a winding drum on said machine, a cable connected to said element and wound on said drum, and means for rotating said drum to wind said cable thereon and swing said element on said fulcrum to dislodge the obstruction, said element being slidable on said fulcrum, two other drums on said machine, cables connected to said elements at opposite sides of said fulcrum and wound on the respective other drums, and means for rotating said drums to wind either cable on its drum while winding the other cable off its drum, to slide said element to or from the obstruction.

7. In a machine of the character described, an element to engage under an obstruction, a fulcrum for said element, near one end of said machine, a supporting wheel for said machine extending past said fulcrum at this end, a winding drum on said machine, a cable connected to said element and wound on said drum, and means for rotating said drum to wind said cable thereon and swing said element on said fulcrum to dislodge the obstruction, said element being slidable on said fulcrum, two other drums on said machine, cables connected to said elements at opposite sides of said fulcrum and wound on the respective other drums, means for rotating said drums to wind either cable on its drum while winding the other cable off its drum, to slide said element to or from the obstruction, independently rotatable driving wheels on opposite sides of said machine, and means for driving said wheels in opposite directions or in the same direction, as required.

RALPH E. BALSLY.

Witnesses:
 JAMES N. RAMSEY,
 MARY M. STAPLETON.